United States Patent
Chung

(10) Patent No.: US 6,340,407 B1
(45) Date of Patent: *Jan. 22, 2002

(54) PROCESS OF MAKING RECYCLED LINERBOARD OR KRAFT PAPER FROM OLD CORRUGATED CONTAINER

(76) Inventor: Sun Ho Chung, 83-19, Chungdam-dong, Kangnam-ku, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/536,450

(22) Filed: Mar. 28, 2000

(30) Foreign Application Priority Data

Dec. 22, 1999 (KR) ............................................ 99-60720

(51) Int. Cl.⁷ ............................................... D21C 5/02
(52) U.S. Cl. ................................ 162/5; 162/8; 162/55; 162/189
(58) Field of Search ................................ 162/4, 5, 6, 7, 162/8, 55, 189

(56) References Cited

U.S. PATENT DOCUMENTS

| | | | | |
|---|---|---|---|---|
| 3,766,001 A | * | 10/1973 | Gleason et al. ................. | 162/8 |
| 3,865,684 A | * | 2/1975 | Gleason et al. ................. | 162/8 |
| 4,154,675 A | * | 5/1979 | Jowett et al. .................. | 210/33 |
| 5,011,741 A | * | 4/1991 | Hoffman ................... | 428/503.1 |
| 5,227,019 A | * | 7/1993 | Borchardt ....................... | 162/6 |
| 5,227,021 A | * | 7/1993 | Hernesniemi et al. ......... | 162/17 |
| 5,700,354 A | * | 12/1997 | Virnelson et al. ............ | 162/143 |
| 5,795,377 A | * | 8/1998 | Tanner et al. ............ | 106/164.4 |

FOREIGN PATENT DOCUMENTS

| | | | |
|---|---|---|---|
| DE | 2917814 | * | 11/1980 |
| GB | 2091576 | * | 8/1982 |
| JP | 58-180698 | * | 10/1983 |
| JP | 8-188999 | * | 7/1996 |
| WO | WO 97/38164 | * | 10/1997 |

OTHER PUBLICATIONS

Lavigne, J.R. "Instrumentation . . . Paper Industry", Miller McFreeman Publications, pp. 207–208, 1979.*

* cited by examiner

Primary Examiner—Dean T. Nguyen
(74) Attorney, Agent, or Firm—Arent Fox Kintner Plotkin & Kahn, PLLC

(57) ABSTRACT

A process for producing new corrugated containerboard from old corrugated container (OCC) without using expensive virgin UKP includes three new steps. These steps are separating corrugated medium from OCC before pulping linerboard, removing micro-fibrils from defibered linerboard furnish, and minimizing the loss of long fibers through reject streams of fine screens.

14 Claims, 2 Drawing Sheets

[Figure1]
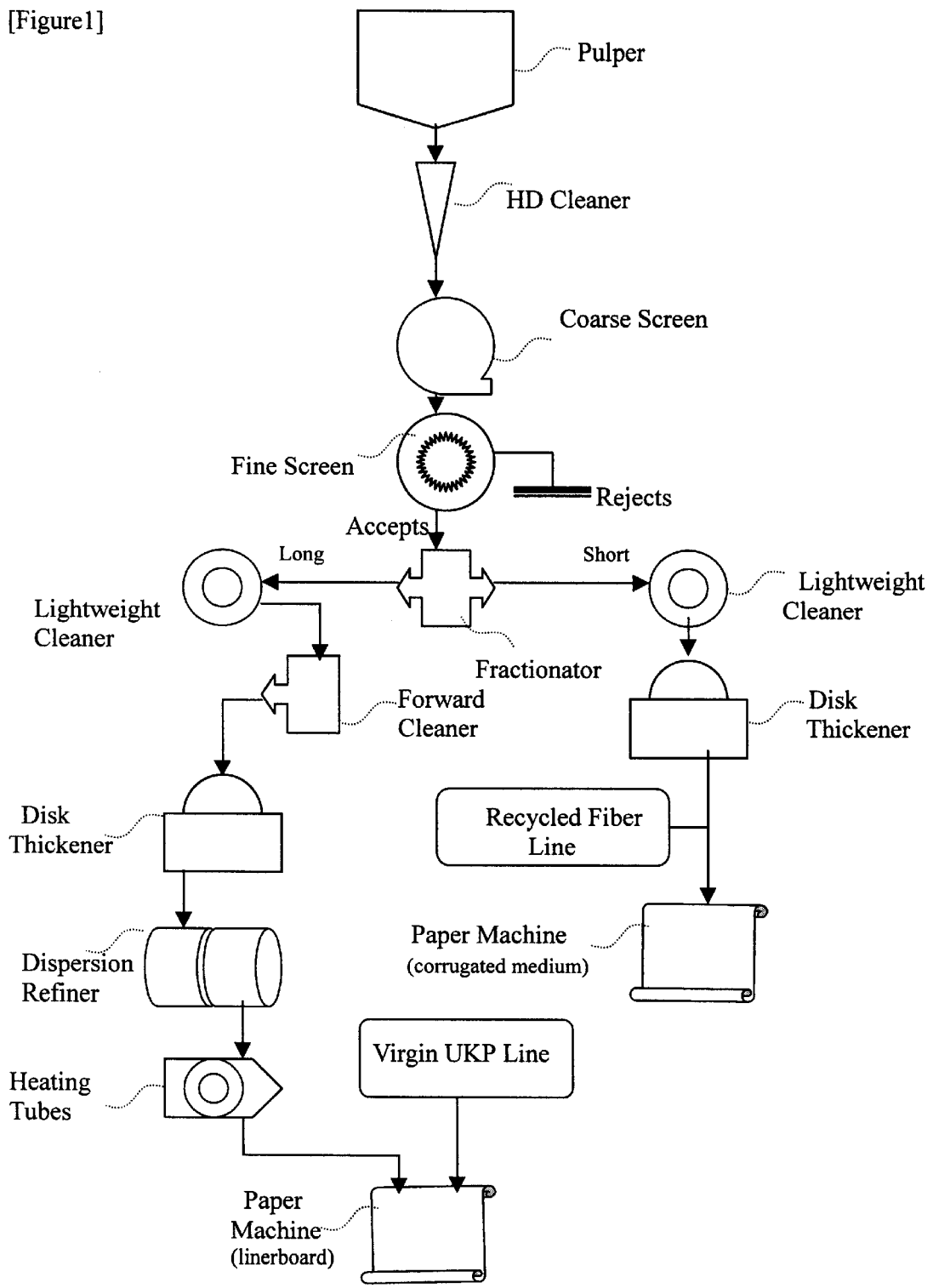

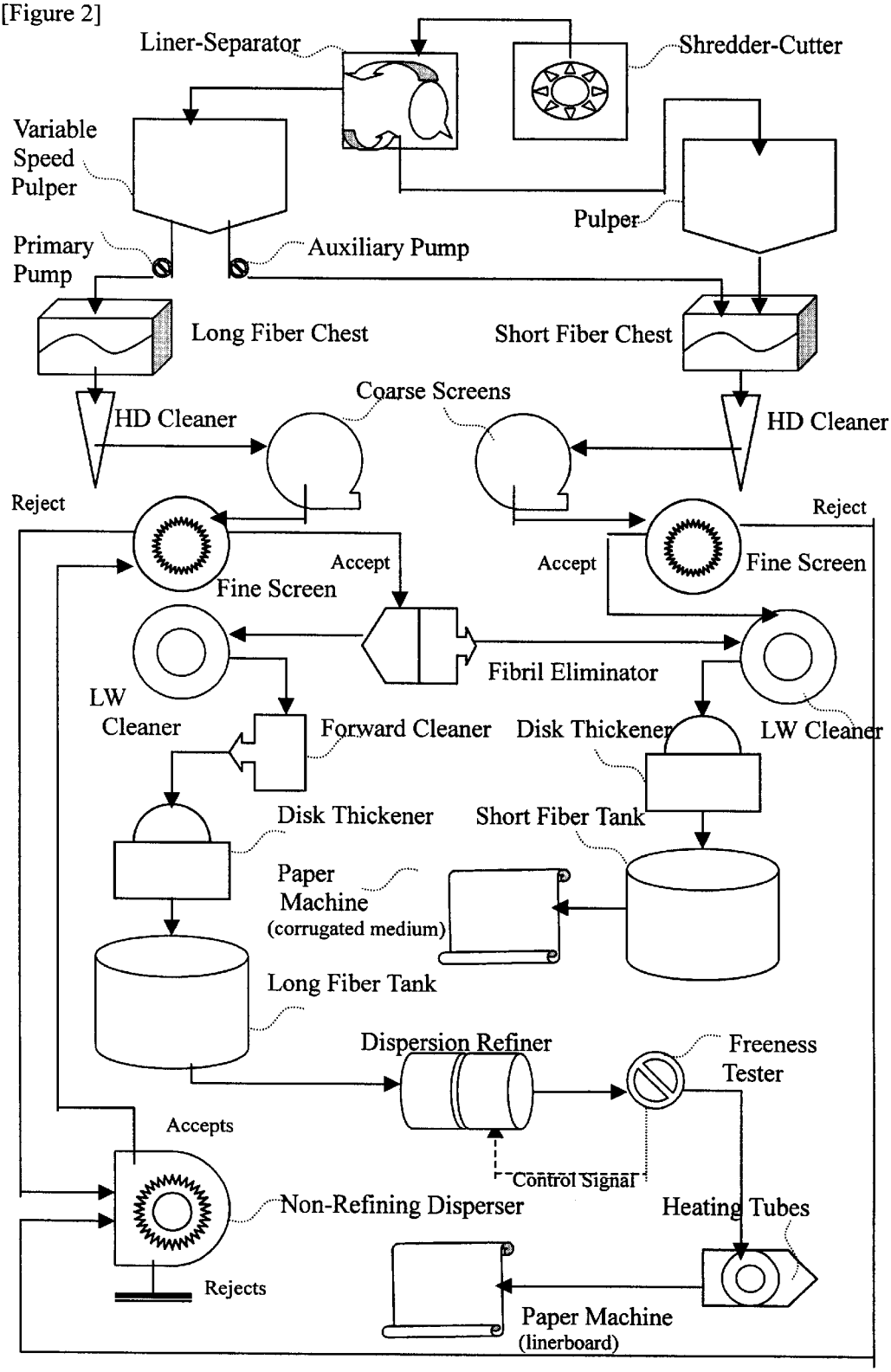
[Figure 2]

PROCESS OF MAKING RECYCLED LINERBOARD OR KRAFT PAPER FROM OLD CORRUGATED CONTAINER

BACKGROUND OF INVENTION

1. Field of Invention

The present invention is directed to the arts of recycling old corrugated container (OCC), more particularly to a process for the making of recycled linerboard or Kraft paper from OCC having strength properties comparable to those made using virgin unbleached Kraft pulp (UKP).

Such recycled linerboard or Kraft paper finds particular application in the inexpensive substitutes for linerboard or Kraft paper made using expensive virgin UKP.

The conventional arts of recycling OCC employ the method of fiber fractionation to separate long fibers (UKP) from OCC furnish. But due to inherent inefficiency of screen-fractionators being used, recovery of UKP content to the level required for high quality linerboard or Kraft paper has not been possible and, therefore, a large amount of virgin UKP had to be added in order to obtain strength properties demanded in the market.

This forced to waste valuable UKP in OCC and consume virgin UKP made from natural timber resources. Thus it would be beneficial to replace virgin UKP by recovered UKP from OCC and eliminate completely the need for using virgin UKP for the making of recycled linerboard or Kraft paper.

2. Description of Prior Arts

A typical stock preparation process for recycled linerboard or Kraft paper using OCC is roughly described by the FIG. 1. A high consistency furnish (4~8%) is formed at the pulper where OCC is defibered by water. Heavy contaminants in OCC furnish are eliminated by high-density cleaners and large size but relatively light contaminants are eliminated by coarse screens. In addition to cleaning and screening, high-density cleaners and coarse screens perform defibering of remaining OCC fractions.

The corrugating medium glued between the two facings of linerboards is composed mainly of semichemical hard wood pulps having fiber length shorter than 2 millimeters. Although unbleached Kraft pulps (UKP) having fiber length longer than 3 millimeters occupies over 80% of linerboard, the UKP content in OCC furnish is reduced to approximately 55% because of the low quality fibers in corrugated medium that takes about one third of the OCC weight.

More water is added to the OCC furnish to make the consistency of the furnish below 1% and sent to fine screens to eliminate small size contaminants from OCC furnish as rejects.

Then accepts from fine screens are sent to fractionators to divide OCC furnish into two separate streams, long fibers and short fibers.

Long fiber stream goes through lightweight cleaners and forward cleaners where lightweight contaminants are eliminated. And at the disk thickener water is removed to make the consistency high enough to be refined by dispersion refiner.

Then the remaining contaminants such as wax are further dispersed into small particles by heating tubes and sent to paper machine wire.

The increase in UKP content in the long fiber stream achieved by fractionators is not sufficient to meet with strength requirement of recycled linerboard or Kraft paper. This forces the addition of virgin UKP to the long fiber stream.

The short fiber stream from fractionators are further cleaned by lightweight cleaner and water is removed by disk thickener before being sent to paper machine that makes corrugating medium. Normally, low quality recycled fiber is further added to the short fiber stream before it is sent to a paper machine that makes corrugating medium.

In the arts of OCC recycling described above, deterioration in strength properties of linerboard or Kraft paper made from fractionated OCC furnish has been taken as unavoidable. Therefore, manufacturing of recycled linerboard or Kraft paper required addition of a large amount of virgin UKP to achieve the level of strength properties demanded in the market.

SUMMARY OF THE INVENTION

In one embodiment, the invention is directed to a stock preparation process for the making of recycled linerboard or Kraft paper, wherein a furnish is prepared by pulping OCC, high-density cleaning, coarse screening, fine screening, fractionating, lightweight cleaning, forward cleaning, disk thickening, dispersion refining, dispersing wax into small particles, and adding virgin UKP, characterized in:

Separating linerboard from corrugated medium before pulping.

In another embodiment, the invention is directed to a stock preparation process for the making of recycled linerboard or Kraft paper, separating linerboard is achieved by shredding and cutting OCC into pieces and then by float-separating linerboard pieces in water.

In still further embodiment, the invention is directed to a stock preparation process for the making of recycled linerboard or Kraft paper, wherein separating linerboard is achieved by crushing OCC into pieces by agitating OCC in water.

In still further embodiment, the invention is directed to a stock preparation process for the making of recycled linerboard or Kraft paper, wherein separating linerboard is achieved by an auxiliary pump and/or gate valve installed between a pulper and a short fiber chest.

In still further embodiment, the invention is directed to a stock preparation process for the making of recycled linerboard or Kraft paper, wherein elimination of micro-fibrils from recycled furnish is achieved by disk thickener and/or fractionators.

In still another embodiment, the invention is directed to a stock preparation process for recycled linerboard or Kraft paper, wherein recovery of long fibers from reject streams of fine screens is achieved by non-refining disperser.

A further embodiment discloses a process of stock preparation for recycled linerboard or Kraft paper characterized in the following steps:

(a) Cutting and/or Crushing OCC into pieces, (b) Separating linerboard pieces from corrugated medium pieces before pulping linerboard pieces, (c) Removing corrugated medium pieces remaining in linerboard pieces by pulping corrugated medium pieces first and then by sending defibered corrugated medium to short fiber chest by actuating auxiliary pump and/or gate valve.

(d) Adding effective amounts of NaOH to the variable speed pulper immediately after removing corrugated medium.

(e) Eliminating micro-fibrils from linerboard or Kraft paper furnish by disk thickener and/or fractionators, (f) Minimizing long fiber loss by recovering long fibers from reject streams of fine screens by non-refining disperser, (g) Applying dry strength additives to linerboard or Kraft paper furnish.

(h) Maintaining a pH of furnish at the head box of paper machine at least 5.5 and at highest 6.5.

BRIEF DESCRIPTION OF DRAWINGS

FIG. 1 is a schematic description of conventional stock preparation process for recycled linerboard and corrugated medium that use OCC that adds virgin UKP to meet strength requirements of linerboard.

FIG. 2 is a schematic description of this invention that reproduces new corrugated container board from OCC without adding virgin UKP.

DETAILED DESCRIPTION OF THE INVENTION

The objective of this invention is to introduce effective means to recover UKP from OCC and apply it to achieve the level of strength properties of recycled linerboard or Kraft paper demanded in the market without adding virgin UKP.

The table below explains the compositions of corrugated container made in the US in 1998.

|  | Year 1998 | | |
| --- | --- | --- | --- |
|  | 1000 tons | % in weight | |
| Corrugated Container | 30,280 | 100.0 | |
| Linerboard | 20,911 | 69.1 | 100.0 |
| Virgin UKP | 16,903 | 55.9 | 80.8 |
| Solid Bleached | 149 | 0.5 | 0.7 |
| Recycled | 3,859 | 12.7 | 18.5 |
| Corrugating Medium | 9,369 | 30.9 | 100.0 |
| Semi-chemical HWP | 5,665 | 18.7 | 60.5 |
| Recycled | 3,704 | 12.2 | 39.5 |

Based on Data Published by American Forest & Paper Association

While the virgin UKP content of linerboard is 80%, the corrugating medium has virtually no UKP and instead it is made of semi-chemical hard wood pulp (HWP) and low quality recycled fiber. As the strength of paper (linerboard or Kraft paper) depends primarily on the average length of the fibers that constitute it, maintaining the UKP content in a paper is the prerequisite to achieve acceptable paper strength. From above table, we see that UKP content decreases to 55.9% in OCC even though it is as high as 80% in linerboard.

Once the linerboard is separated from OCC before pulping OCC, the remaining OCC furnish will have higher UKP content close to 80%. Hence, the separation of linerboard from OCC before pulping is a must in order to achieve the strength properties of recycled linerboard or Kraft paper without adding any virgin UKP.

There are other causes that contribute to the deterioration of strength properties of recycled linerboard or Kraft paper. One of the causes is the loss of fiber strength due to hornification of hydrogen bonded fibrils. A large portion of hornified fibrils turn into micro-fibrils in the process of re-pulping when they are stressed during the process of defibering and cleaning. When they remain in furnish, they tend to interfere with new hydrogen bonds to be made between recycled fibers resulting in the reduction of relative bonded area (RBA) between fibers and consequently reducing tensile strength of recycled paper.

Another factor involves the loss of long fibers through the reject streams of fine screens, which results in the further decrease of UKP content in furnish.

Therefore, in order to achieve the adequate level of UKP content in recycled linerboard or Kraft paper without adding any virgin UKP, two techniques must be employed in addition to separating linerboard from OCC before pulping. They are elimination of micro-fibrils from furnish and minimization of lost long fibers.

As corrugated medium made from semi-chemical HWP and low grade recycled fibers is glued between the two faces of linerboards using starch, addition of water resolves the starch loosening corrugated medium pieces from linerboard pieces.

To achieve high efficiency of linerboard separation from OCC, a process of shredding and cutting OCC is required. However, in the case of using already cut corrugated container boards such as new DLK corrugated cuttings, the process of shredding and cutting is not necessary.

With slight agitation of water soaked OCC pieces, corrugated medium pieces loosens themselves from linerboard pieces. When enough amount of water is added further, linerboard pieces having lighter specific gravity than soaked corrugated medium pieces float in the water, making the separation of linerboard pieces from corrugated medium pieces an easy task.

In the next step, separated linerboard pieces are sent to the variable speed pulper having primary and auxiliary pumps or gate valve to short fiber chest. At the beginning stage of pulping, slow speed agitation of linerboard pieces mixed with corrugated medium pieces by the impeller of the pulper defibers corrugated medium pieces first before linerboard pieces are defibered. Then auxiliary pump and/or gate valve to short fiber chest is activated to send defibered corrugated medium pieces to short fiber chest.

After defibered corrugated medium pieces are removed by low speed pulping and activating the auxiliary pump or gate valve to short fiber chest, an adequate amount of NaOH is added to the linerboard pieces remaining in the variable speed pulper. Then the second stage pulping operation is conducted with much higher impeller speed, which is required to defiber linerboard pieces, some of which are heavily wet strengthened.

Normally quite a large amount of long fibers are lost through reject streams of fine screens. This is undesirable because it reduces long fiber (UKP) content in furnish and at the same time increases the amount of sludge, resulting in the deterioration of strength properties of linerboard or Kraft paper. To recover long fibers in the reject streams of fine screens, an additional process of defibering of hornified and/or wet strengthened linerboard fractions remaining in the reject streams is required. A non-refining disperser that does the job of defibering linerboard fractions and separating those fibers attached to contaminants improves strength properties of recycled linerboard or Kraft paper.

A process of micro-fibrils elimination by means either of fractionators having small holes than normal or disk thickener having larger holes than normal is necessary to improve strength properties of recycled linerboard or Kraft paper.

EXAMPLES

The first example is the case of using recovered UKP from OCC for recycled Kraft paper manufacturing. After linerboard pieces are separated from 1 ton of OCC, about the half a ton of old sack Kraft paper is added together with 15 Kg of NaOH just before the second stage pulping. The test results are compared against Korean standards in the following table.

| | | Tests | | | | | | |
|---|---|---|---|---|---|---|---|---|
| | | TBS (Kgf) | | TBS 5 Stretch Rate | | Tear | | |
| Items | BW (g/m²) | MD | CD | MD | CD | MD | CD | Sizing |
| KS | 80 | 6.8 | 3.5 | 15.0 | 16.8 | 95 | 108 | 15 and up |
| A | 79.8 | 8.1 | 3.9 | 15.9 | 16.8 | 99 | 104 | 16 |
| B | 79.6 | 8.1 | 3.9 | 15.3 | 17.2 | 96 | 114 | 17 |
| C | 80.2 | 5.7 | 3.1 | 14.5 | 15.6 | 88 | 96 | 15 |

KS: Korean Standard
BW: Basis Weight
TBS: Tensile Breaking Strength
A. The first sample taken from Kraft paper made by the process specified in this invention.
B. The second sample taken from Kraft paper made by the process specified in this invention.
C. The sample taken from Kraft paper in which corrugated medium is not removed as the case with conventional method.

It can be seen from above test results that separation of linerboard by the method specified by this invention made it possible to achieve the level of tensile breaking strength and stretch specified by Korean standard. This has been possible only by adding virgin UKP to OCC furnish. This implies the fact that UKP in OCC is effectively recovered and utilized for the enhancement of strength properties of recycled Kraft paper.

In another example, this invention is applied to 21.7 tons of OCC. Since average UKP content of US made OCC is 55% (1998 data published by American Forest and Paper Association), at least 55% of OCC must be recovered and turned into Kraft paper by this invention.

The recycled Kraft paper, made from the OCC by applying this invention without adding any old Kraft paper sack, weighed 12.01 tons (55.35% of OCC). The tensile breaking strength of the Kraft paper was measured between 6.8 Kgf and 7.4 Kgf at the basis weight of 78.2 g/m² and 79.5 g/m² respectively. The freeness of the furnish was between 27° and 29° implying that the tensile strength could have been better than that if adequate refining had been done. (Normally 35° to 37° gives at least 10% improvement in tensile strength) Relatively higher freeness of furnish implies that the UKP content in the Kraft paper was higher than 80%. Therefore, the above results verify that this invention successfully recovered UKP from OCC and transformed it into high UKP content Kraft paper.

Since linerboard is essentially the same Kraft paper having different physical dimensions specified for the purpose of making corrugated container, the above examples on strength properties of Kraft paper readily apply to strength properties of linerboard. That is, when this invention is applied to conventional corrugated container mills, the strength properties of linerboard produced by applying this invention will readily satisfy those demanded in the market. Hence, we may say that this invention will make it possible to reproduce new corrugated container from OCC without adding any virgin UKP, and without sacrificing any strength properties of OCC.

What is claimed is:

1. In a process of making a stock preparation for recycled linerboard or Kraft paper wherein OCC is defibered, cleaned, screened, fractionated into long fibers and short fibers, long fibers being refined to required level of freeness, virgin pulps added to achieve required strength properties, and deposited on a wire and dewatered, the strength properties of the stock are improved by a process comprising the steps of:

cutting and/or crushing OCC that contains corrugated medium attached to linerboard into pieces, separating linerboard pieces from corrugated medium pieces, removing any remaining corrugated medium pieces from OCC furnish containing the separated linerboard pieces, adding NaOH to the separated linerboard pieces in the OCC furnish, defibering the separated linerboard pieces in the OCC furnish, eliminating micro-fibrils from long fibers in the OCC furnish, minimizing the loss of long fibers by recovering any long fibers from reject streams, applying dry strength additives to the OCC furnish, and maintaining a furnish pH of from 5.5 to 6.5 at the head box of paper machine.

2. The process of claim 1 wherein the furnish is a mixture of stock and water and is a pulp recycled from OCC, old Kraft paper sacks, waste paper and mixture thereof.

3. The process of claim 1 wherein the furnish is a mixture of stock and water and the stock is a pulp recycled from OCC, old Kraft paper sacks, waste paper and mixture thereof, the improvement in strength properties of recycled linerboard or Kraft paper comprising increasing unbleached Kraft pulp content in the furnish by separating linerboard from OCC before pulping OCC.

4. The process of claim 3 wherein the separation of linerboard from OCC is achieved by breaking OCC into pieces.

5. The process of claim 4 wherein breaking OCC into pieces is achieved by shredding and cutting OCC.

6. The process of claim 4 wherein the breaking OCC into pieces is achieved by immersing and agitating OCC in water.

7. The process of claim 3 wherein, the separation of linerboard from OCC is achieved by defibering corrugated medium pieces first and removing defibered corrugated medium from pulper by the auxiliary pump and/or gate valve.

8. The process of claim 1 wherein the furnish is a mixture of stock and water and the stock is a pulp recycled from OCC, old Kraft paper sacks, waste paper and mixture thereof, the improvement comprising recovering long fibers from the reject streams of fine screens.

9. The process of claim 8 wherein the recovery of long fibers from reject streams of fine screens is achieved by non-refining defibering process applied to hornified and/or wet strengthened OCC fractions rejected by fine screens.

10. The process of claim 1 wherein improvement of stength properties of linerboard or Kraft paper is achieved by increasing unbleached Kraft pulp content in the furnish by increasing the speed of pulper impeller after corrugated medium is removed from linerboard furnish.

11. The process of claim 1 wherein improvement of strength properties of linerboard or Kraft paper is achieved by maintaining pH at the head box of the paper machine at least 5.5 and at highest 6.5.

12. The process of claim 1, further comprising recovering unbleached Kraft pulp by blending of long unbleached Kraft pulp fibers stored in a long fiber tank with short fibers stored in a short fiber tank.

13. The process of claim 1, further comprising drying and packaging recovered unbleached Kraft pulp stored in the long fiber tank.

14. The process of claim 1, further comprising eliminating micro-fibrils from the recycled furnish is by enlarging holes and/or controlling the rotating speed of screens of a fiber extractor and/or by choosing appropriate hole sizes of fractionators.

* * * * *